US011800316B1

(12) United States Patent
Cahill et al.

(10) Patent No.: US 11,800,316 B1
(45) Date of Patent: Oct. 24, 2023

(54) SYSTEM AND METHOD FOR PROVIDING A MICRO REGISTRY

(71) Applicant: AMERICAN EXPRESS TRAVEL RELATED SERVICES COMPANY, INC., New York, NY (US)

(72) Inventors: Mike Cahill, San Rafael, CA (US); Graeme Fordyce, Los Angeles, CA (US); David Yoo, Ridgewood, NJ (US)

(73) Assignee: American Express Travel Related Services Company, INC., New York, NY (US)

( * ) Notice: Subject to any disclaimer, the term of this patent is extended or adjusted under 35 U.S.C. 154(b) by 0 days.

(21) Appl. No.: 17/661,998

(22) Filed: May 4, 2022

Related U.S. Application Data

(63) Continuation of application No. 16/735,109, filed on Jan. 6, 2020, now abandoned, which is a continuation of application No. 14/454,452, filed on Aug. 7, 2014, now abandoned.

(51) Int. Cl.
*H04W 4/80* (2018.01)
*H04W 4/021* (2018.01)

(52) U.S. Cl.
CPC .............. *H04W 4/021* (2013.01); *H04W 4/80* (2018.02)

(58) Field of Classification Search
CPC ................................ H04W 4/021; H04W 4/80
USPC ......................................................... 455/41.2
See application file for complete search history.

(56) References Cited

U.S. PATENT DOCUMENTS

| 10,097,663 | B1* | 10/2018 | Ferenczi ............... H04L 63/102 |
| 10,217,151 | B1* | 2/2019 | Greiner .................. H04W 4/80 |
| 10,395,237 | B2* | 8/2019 | Basheerahammed ....................... G06Q 20/3278 |
| 10,579,985 | B2* | 3/2020 | Laracey ............ G06Q 20/3224 |
| 10,586,225 | B2* | 3/2020 | Laracey ............ G06Q 20/3278 |
| 10,636,019 | B1* | 4/2020 | Abrons .................. G06Q 50/12 |
| 11,232,187 | B2* | 1/2022 | Bruno ................. H04L 63/0853 |
| 11,403,615 | B2* | 8/2022 | Laracey ............ G06Q 30/0253 |
| 11,436,578 | B2* | 9/2022 | Abrons .............. G06Q 20/20 |
| 11,580,574 | B2* | 2/2023 | Bruno ................ G06F 21/6272 |
| 2015/0339655 | A1* | 11/2015 | Basheerahammed ....................... G06Q 30/0641 705/14.64 |
| 2016/0012465 | A1* | 1/2016 | Sharp .................. G06Q 20/321 705/14.17 |
| 2016/0063476 | A1* | 3/2016 | Baldie ............... G06Q 20/3224 705/44 |
| 2017/0098209 | A1* | 4/2017 | Laracey ............ G06Q 20/3226 |
| 2017/0098210 | A1* | 4/2017 | Laracey ............ G06Q 20/3224 |
| 2017/0330215 | A1* | 11/2017 | Bruno ................ G06Q 30/0239 |
| 2017/0330233 | A1* | 11/2017 | Bruno ................ G06Q 30/0255 |
| 2018/0012221 | A1* | 1/2018 | Crofts ................ G06Q 20/401 |
| 2018/0075420 | A1* | 3/2018 | Barnett ............... G06Q 20/321 |

(Continued)

*Primary Examiner* — April G Gonzales
(74) *Attorney, Agent, or Firm* — Thomas | Horstemeyer, LLP

(57) ABSTRACT

In various embodiments, a micro registry may be a mobile communication platform that is configured to connect to users and service hosts. The micro registry may facilitate advertisements, payments, communication, loyalty, behavior tracking, social media interaction, and/or any other suitable communication advertising, or transaction between a user and a service host. The micro registry may employ BLE beacons that enable the micro-registry to identify micro-locations and facilitate connections (e.g., interfaces, interactions, communications, etc.) between user devices and service hosts and/or merchants.

20 Claims, 3 Drawing Sheets

(56) References Cited

U.S. PATENT DOCUMENTS

| | | | |
|---|---|---|---|
| 2018/0144342 A1* | 5/2018 | Borandi | G06Q 20/00 |
| 2018/0260808 A1* | 9/2018 | Calderone | G07G 1/00 |
| 2018/0288176 A1* | 10/2018 | Naqvi | G06Q 30/0251 |
| 2018/0322205 A1* | 11/2018 | Balaraman | G06F 16/9558 |
| 2020/0273005 A1* | 8/2020 | Abrons | G06Q 20/20 |
| 2020/0311710 A1* | 10/2020 | Laracey | G06Q 20/3226 |
| 2022/0383277 A1* | 12/2022 | Abrons | G06Q 30/0207 |

\* cited by examiner

SYSTEM AND METHOD FOR PROVIDING A MICRO REGISTRY

This application is a continuation of and claims the benefit of U.S. patent application Ser. No. 16/735,109, entitled "SYSTEM AND METHOD FOR PROVIDING A MICRO REGISTRY," and filed Jan. 6, 2022, which is a continuation of and claims the benefit of U.S. patent application Ser. No. 14/454,452, entitled "SYSTEM AND METHOD FOR PROVIDING A MICRO REGISTRY," and filed Aug. 7, 2014, which are hereby incorporated by reference in their entireties.

FIELD

The present disclosure relates to systems and methods for providing a micro registry, and more specifically, to creating a network to facilitate communication between users in short rage communication network.

BACKGROUND

Current Bluetooth low energy ("BLE") beacons can provide information that can be correlated to a location. This information may facilitate communication between a user, and an individual service host or merchant based on the location of the user as identified by the information provided by the beacon. However, the individual communication may require that a user switch between service providers when interacting with different merchants. The requirement to switch between service providers may fragment the user's relationship with the merchant and/or service provider. Moreover, there is not a standard for access or communication between a user and merchants and/or service providers.

SUMMARY

A system, method, and computer readable medium (collectively, the "System") for administering a short range communication network may comprise operations and/or steps performed by a computer based system including: receiving first location information associated with a user device from a beacon; receiving, via the beacon, a service request from the user device through a mobile application; determining a service host for the service request, wherein the service host is associated with a service host identifier, and wherein the service host is one of a plurality of service hosts; transmitting merchant information and service request information to the service host; and connecting the mobile application and the service host.

The computer based system may comprise a service host location database that comprises virtual addresses for a plurality of service hosts.

The beacon may comprise a wireless communication protocol. The wireless communication protocol may be a Bluetooth low energy communication protocol.

The service request may launch the mobile application associated with a merchant. The service request may also be a request to initiate a payment with a transaction account. The transaction account may be associated with at least one of the mobile application, the service host, or the service request.

The system may further comprise a computer based system performing operations and/or steps including: displaying, via the mobile device, the service hosts content. The computer based system may also comprise at least one of a merchant gateway or a third party gateway. The content of the service host may be provided through at least one of the merchant gateway or the third party gateway.

The system may further comprise a computer based system performing operations and/or steps including: parsing the service request, wherein the service request includes the service host identifier; analyzing the service host identifier to determine a service host; determining an electronic location of a service host from a database of service host locations, wherein the database comprises a listing corresponding to the plurality of service hosts, and wherein each of the plurality of service hosts is associated with an electronic location.

The system may further comprise a computer based system performing operations and/or steps including: requesting content from the service host responsive to the service request, wherein the request is sent to the electronic location associated with the service host; and presenting the content to the user device at the micro registry and via the user gateway.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1A:
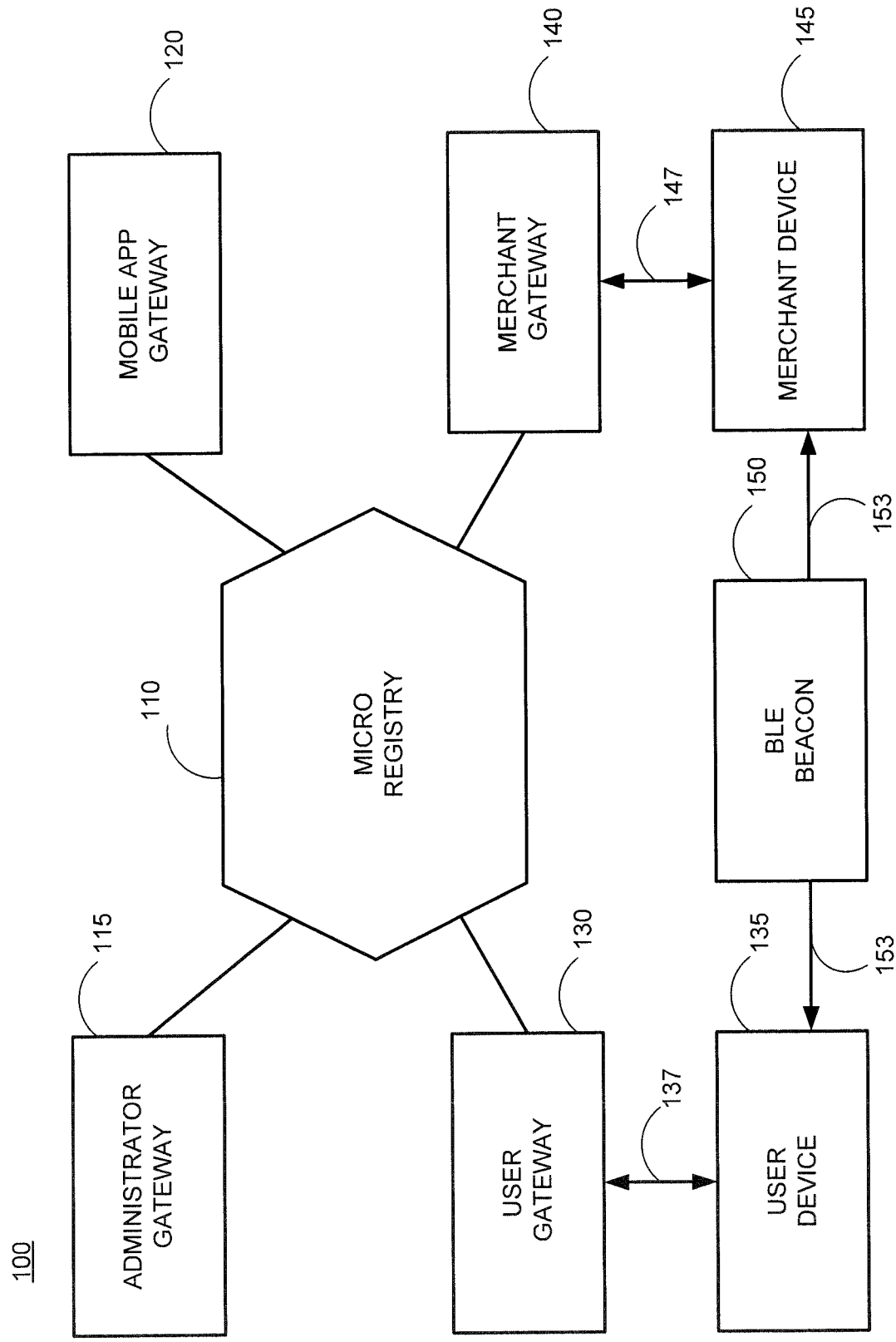
FIG. 1A illustrates a system architecture for a micro registry, in accordance with various embodiments.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, a micro registry may be a mobile communication platform that is configured to connect to users and service hosts. The micro registry may facilitate advertisements, payments, communication, loyalty, behavior tracking, social media interaction, and/or any other suitable communication advertising, or transaction between a user and a service host. The micro registry may employ BLE beacons that identify a user location based on an identifier. By providing the identifier to the micro-registry via a user device, a merchant associated with the beacon, merchant information, the user location and other information may be provided by the registry to the user device. Moreover, the user device may be routed by the micro-registry to additional content (e.g., a url associated with a location (e.g., a merchant) and/or a service host acting on behalf of and/or associated with the location).

In various embodiments, the identifier may comprise a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers. The unique combinations of major numbers and minor number may be assigned to BLE beacons and/or associated locations. As such, the identifier received by the user device and provided to the micro registry may be associated with a particular micro-location.

The micro registry may also employ one or more API's that allow service hosts and/or merchants to provide content, connect, and/or interact with various services including, for example, mobile services, payment services, loyalty services, advertising services, and/or the like.

As used herein, a "micro-location" of a user may comprise a location of a user in relation to any energy consuming device. For example, the energy consuming device may comprise a high, medium, and/or low energy consuming device and/or any combination thereof. For example, the energy consuming device may be a low power and/or low energy consuming device. Such a device may be a BLUETOOTH device, such as a wireless beacon communicating using a low power or low energy BLUETOOTH communication standard (a "BLUETOOTH LOW ENERGY beacon" or simply, a "BLE beacon"). However, in various embodiments, any type of low energy consuming device may be implemented with the systems described herein. For example, in various embodiments, any device (including any other BLE beacon) capable of communicating with a web-client and/or any other BLE beacon within three hundred meters of a BLE beacon may comprise a low energy consuming device. Thus, although the phrase "BLE beacon" is used herein with particular respect to a BLUETOOTH low energy consuming device, a BLE beacon may comprise any energy consuming device capable of communication with a web-client. In various embodiments, the low energy consuming device may capable of communication with a web-client to within approximately three hundred meters or less—that is, any device capable of communicating with a web-client within a micro-location of the web-client. As described above, a low energy consuming device (e.g., BLE beacon 150) may comprise any device capable of transmitting and/or receiving a signal wirelessly using a low power or low energy connection to a network. In various embodiments, such a signal may comprise a BLUETOOTH signal. A BLUETOOTH signal may comprise and/or utilize one or more internet protocol ("IP") session connections. The IP session connections may enable a variety of piconet communication technologies. In various embodiments, particularly with regard IP version 6, a cryptographic key exchange protocol (symmetric and/or asymmetric) may be implemented. For example, a key management device may utilize IEEE Standard 1363.1-2013 for identity based cryptographic techniques that utilize pairings such that an encryption key may comprise one or more plain text strings (such as one or more email addresses).

Accordingly, although the term "BLE beacon" is used herein in association with a BLUETOOTH communication protocol and/or signal, the phrase may refer to any communication protocol and/or any other "low energy" signal. As used herein, a "low energy signal" may comprise any signal capable of being received by a web-client within a range of approximately three hundred meters or less. In various embodiments, a BLE beacon may enable the discovery of a micro-location of a user. A micro-location may comprise any location of the user within, for example, user within a defined distance such as, within 100 meters of a BLE beacon.

The BLE beacons may be deployed in various physical locations including, for example, brick and mortar merchant locations. A merchant may use a third party service host to facilitate interactions between the merchant and the user. In this regard, the micro registry may help merchants engage users seamlessly, without regard to the service host employed by the merchant, because the service host will be seamlessly and instantly accessible through the micro registry. Moreover, the micro registry may reduce fragmentation of mobile and/or geo-location services.

As e-commerce and digital activities grow and the boundaries of the virtual marketplace and virtual world disappear, consumers are looking for ways to more easily conduct transactions, connect with merchants, obtain information about items, initiate transactions to make purchases, receive rewards, reverse items and/or the like. Providing a network that facilitates interactions between various service hosts, merchants, loyalty programs, acquirers, transaction account issuers, points of sale, payment services and/or the like allows the user to seamlessly connect with the merchant. This network also minimizes and/or eliminates the fragmentation that may occur, where service hosts are not accessible on the same network.

Phrases and terms similar to "business," "service host" or "merchant" may be used interchangeably with each other and shall mean any person, entity, distributor system, software and/or hardware that is a provider, broker and/or any other entity in the distribution chain of goods or services. In this regard, the "business," "service host" or "merchant" may facilitate a real world or virtual interaction, transaction, exchange of information between a supplier of an item and a user. This interaction or transaction may be trigger by a service request from a user in a micro registry.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) (iii) a digital channel, (iv) a service request, (v) a service host, and/or the like. Moreover, the associating may occur at any point, in response to any suitable action, event, or period of time. The associating may occur at pre-determined intervals, periodic, randomly, once, more than once, or in response to a suitable request or action.

The micro registry may allow any digital channel to be augmented or supplemented to become a payment channel. In operation, the system is capable connecting, associating and/or otherwise facilitating a connection and/or exchange between a user and a service host.

In various embodiments, and with reference to FIG. 1A, system 100 may comprise a micro registry 110, an administrator gateway 115, a mobile app gateway 120, a user gateway 130, a merchant gateway 140, and a BLE beacon 150. Micro registry 110 may act as a hub or routing system that is capable of hosting and/or connecting any of administrator gateway 115, mobile app gateway 120, user gateway 130, merchant gateway 140, and/or BLE beacon 150 together. In this regard, micro registry 110 may facilitate the exchange of content, data, information, transaction information, offer information, advertising information, and/or the like. BLE beacon 150 may also be configured as a stand-alone transmitter that is configured to transmit an identifier to a user device 135 and/or a merchant device 145 via a BLE communication 153.

Figure 1B:
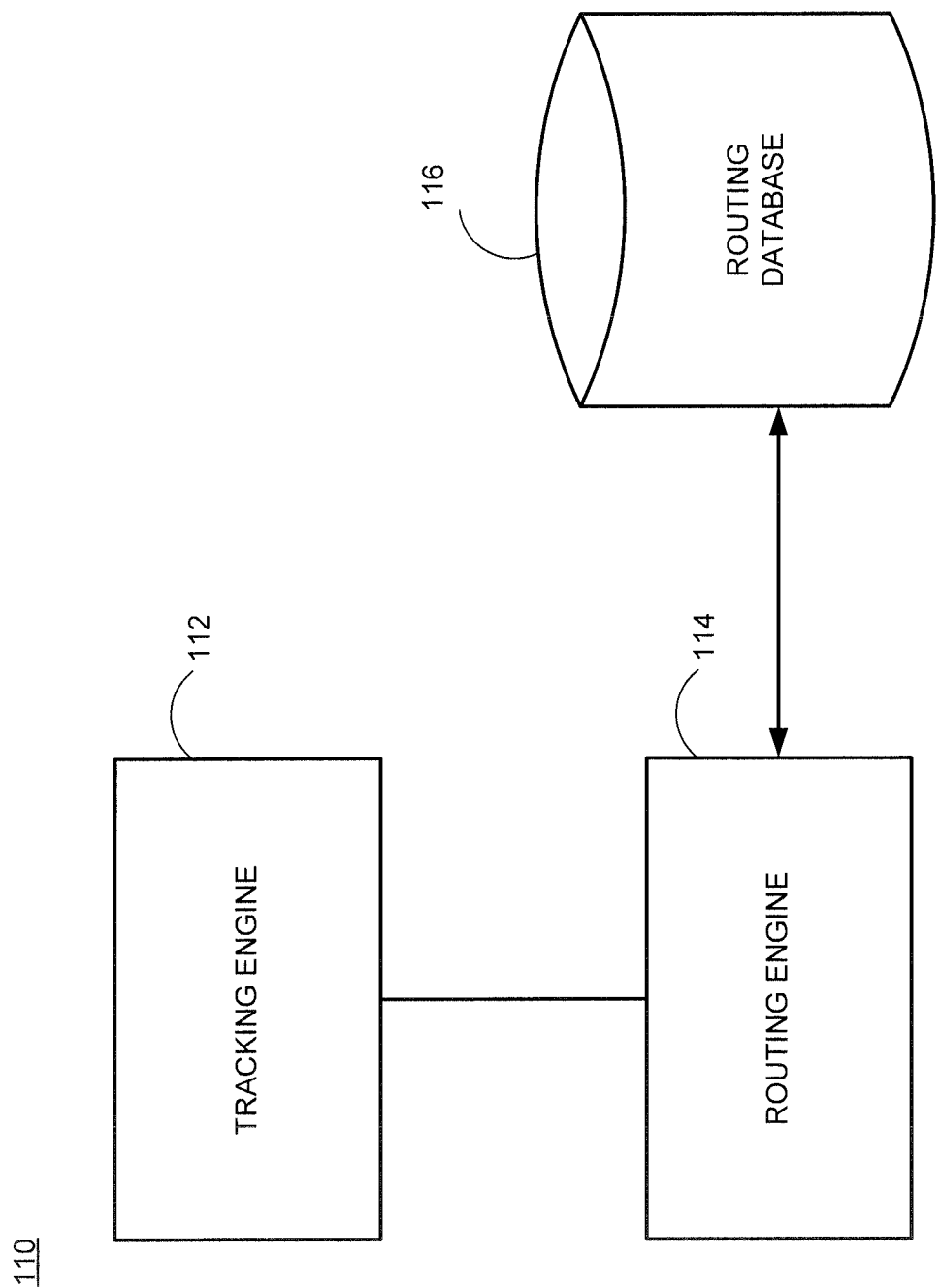
FIG. 1B illustrates exemplary micro registry modules, in accordance with various embodiments.
Figure 2:
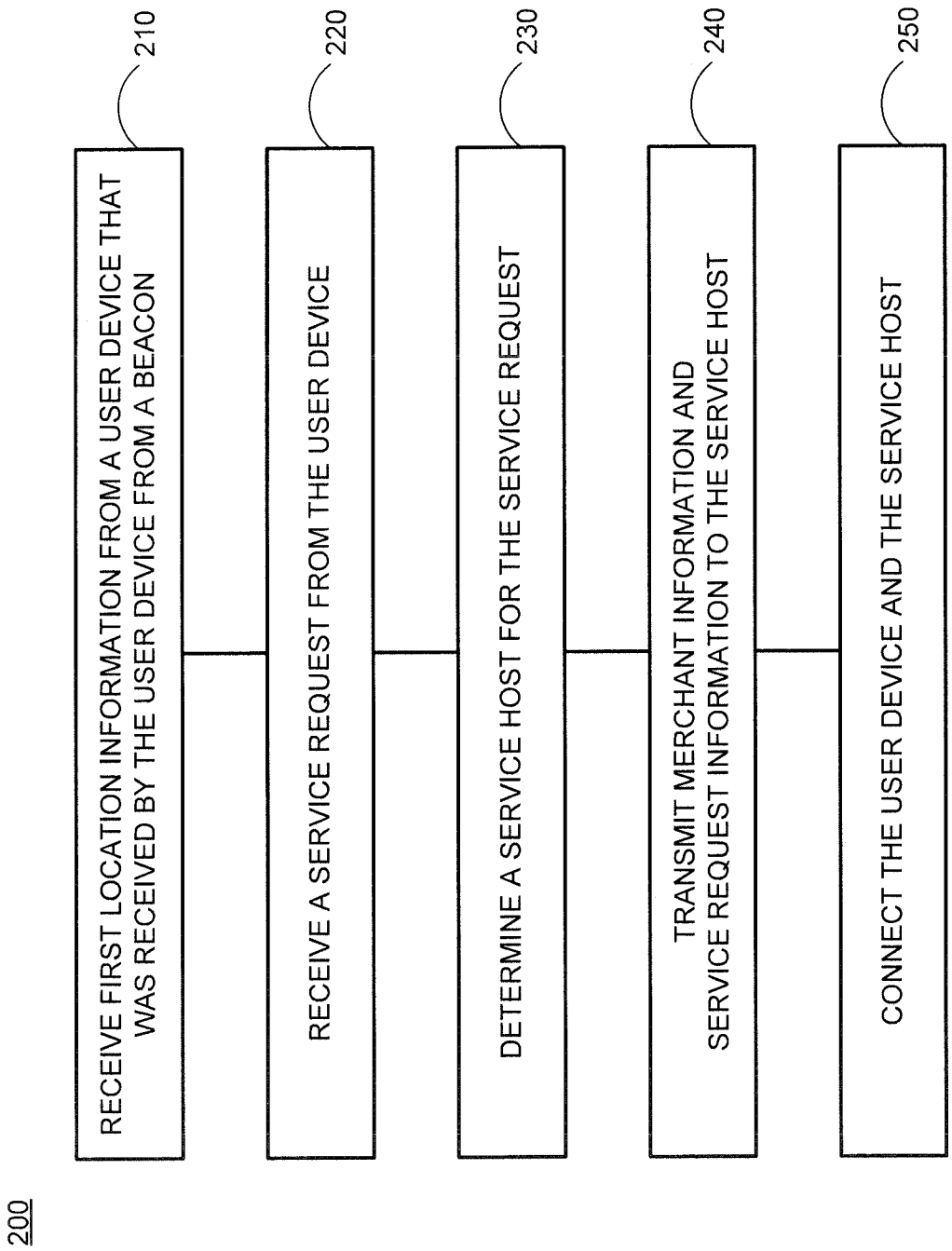
FIG. 2 is a process flow for operating an exemplary micro registry, in accordance with various embodiments.

In various embodiments, and with reference to FIGS. 1A-1B, micro registry 110 may be any suitable software, hardware, and/or hardware-software system that is configured to facilitate communication between users and service hosts. Micro registry 110 may comprise a tracking engine 112, a routing engine 114, a routing database 116, and/or any other suitable component, module, engine, and/or software or hardware system. Tracking engine 112 may be configured to track, monitor, identity, and/or otherwise locate a user and/or user device in response to user device 135 providing an identifier from BLE beacon 150. In this regard, the user device may receive an identifier from the BLE beacon. BLE beacon 150 may be configured to create a geo-fence. This geo-fence may be an electronic boundary, perimeter, fence, and/or area where a BLE signal is transmitted from BLE beacon 150 to the area. User device 135 may be capable of interacting with, receiving, and/or answering the transmission of BLE beacon 150. User device 135 may then communicate that identifier to tracking engine 112. Tracking engine 112 may be configured to receive the identifier from the user device. In response to receiving the identifier, tracking engine 112 may be capable of identifying the location and/or micro-location of a user, a particular user, and/or a particular device.

In various embodiments, tracking engine 112 may also be configured to provide preliminary information about the location associated with the identifier. For example, tracking engine 112 may be configured to provide a location information, a merchant name and first merchant information (e.g., preliminary merchant information including for example, a merchant name, an identifier, and a path to additional location content (e.g., a path or url) and/or the like) to the user device and a routing engine. Moreover, tracking engine 112 may be configured to link the user device to routing engine 114 via routing database 116 to facilitate further interaction or information being provided to the user device.

In various embodiments, routing engine 114 may be configured to connect users and service hosts. Routing engine 114 may be capable of accessing routing database 116, may be in electronic communication with routing database 116, and/or may utilize routing database 116. In this regard, routing database 116 may comprise correlating information that identifies a particular electronic address or location for a particular service host. Moreover, routing database 116 may comprise a plurality of electronic locations for a plurality of service hosts. In this regard, each service host may have an associated electronic address or location corresponding to a unique identifier (e.g., a GUID with a unique major number and minor number). For example, a different identifier and/or address may uniquely (or respectively) correspond to a service host or subset of hosts.

In various embodiments and with reference again to FIGS. 1A and 1B, administrator gateway 115, user gateway 130, mobile app gateway 120, and/or merchant gateway 140 may be in communication with micro registry 110. In this regard, administrator gateway 115, mobile app gateway 120, user gateway 130, and/or merchant gateway 140 may be in communication with one another via micro registry 110. Moreover, micro registry 110, via tracking engine 112, may receive first location information from a user device 135 based on the user device interacting with and/or receiving an identifier from a BLE beacon (Step 210). In this regard, tracking engine 112 may be configured to monitor user gateway 130 for user device 135. User device 135 may be capable of accessing micro registry 110 via a network 137 (e.g., the internet or any suitable network) and via or through user gateway 130. User device 135 may break a geo-fence, and/or enter a geo-location. In this regard, user device 135 may receive a BLE communication from a BLE beacon 150 associated with and or registered with micro registry 110. User device 135 may receive an identifier from BLE beacon 150. User device 135 may provide the identifier from beacon 150 through user gateway 130. The identifier may particularly identify a location associated with BLE beacon 150. An identifier may be associated with a specific location, such as for example, a merchant location, a portion of a merchant location and/or the like. User device 135 may also transmit a user ID that may particularly identify a user and/or user device 135 as a user that has permission to user of micro registry 110. In this regard, the permissions associated with the micro-registry may require that the user and/or user device 135 be registered with the micro-registry. Micro registry 110 may comprise permission that evaluate whether a particular user device 135 has permission to access micro registry 110. Moreover, micro registry 110 may comprise varying levels of permissions for access that may be set by a user, or by an administrator through an administrator gateway 115.

Micro registry 110 may also receive a service request from the user device 135 (Step 220). The service request may be transmitted from a user through user device 135 and through user gateway 130 to micro registry 110. The service request may be provided via a mobile application present on user device 135 (e.g., a micro app).

Micro registry 110 may be capable of determining a service host for the service request (Step 230). In this regard, routing engine 114 may be configured to analyze the service request provided by the user from the user device 135 via user gateway 130. Routing engine 114 may identify a service host based on the service request. In response to identifying the service host, routing engine 114 may access routing database 116 to determine an electronic address associated with the service host. Routing database 116 may also comprise and/or provide preliminary service host and/or merchant information to micro-registry 110 for transmission to user device 135. Moreover, micro registry 110 via routing engine 114 may transmit merchant information and the service request information to the service host (Step 240).

In various embodiments and based on the identification of the service host and the transmission of the service request, routing micro registry 110 via routing engine 114 may connect the user device 135 with the service host (Step 250). In this regard, micro registry 110 may route a browser, an application, or an environment present on user device 135 to a server capable of hosting service host information and providing the content requested in the service request provided through user device 135. The connection between user device 135 and the service host may be any suitable connection in an environment provided by micro registry 110 and/or the service host. Moreover, the connection may be virtual, may be a facilitation and/or may be an enablement of communication and/or data exchange and/or any other suitable connection. In this regard, the connection need not be an actual, physical connection. Micro registry 110 may also be an environment that hosts and/or connects user device 135 and the service hosts. In this regard, the service hosts may push content to micro registry 110 that connects to user device 135 via user gateway 130.

In various embodiments, a service host may be any suitable merchant, payment provider, loyalty program provider, acquirer, issuer, and/or the like. For example, a service host may be a merchant or a merchant payment processor that is capable of facilitating transactions and/or transmitting content from a merchant to user device 135. A service host may access micro registry 110 via mobile app gateway 120 and/or merchant gateway 140. In this regard, the service host may be a mobile application or micro application provider including any suitable social media, any suitable digital channel, social media network, social media platform, and/or the like.

In various embodiments and as used herein, a digital channel may be any suitable channel available to a user over a network, including for example, a social media channel, an entertainment channel, a service channel, a review channel, a service scheduling channel, and/or the like. The channel may include a user interface and user account that may be created by a user. Moreover, the user may be able to access the digital channel through a web client on any suitable electronic device. The digital channel may also be considered a non-traditional payment channel. In this regard, the digital channel may be capable of facilitating and/or initiating a payment, but may not be a traditional virtual or actual POS.

Micro registry 110 may also facilitate direct, virtual contact between a merchant and a user. For example, micro registry 110 may connect a user device 135 and a merchant device 145 via user gateway 130 by network 137 (e.g., the internet and/or any other suitable network) and merchant gateway 140 by network 147 (e.g., the internet and/or any other suitable network), respectively. In this regard, micro registry 110 may facilitate an interaction between a user and a merchant by connecting a user device 135 and a merchant device 145. Moreover, this connection may also provide a user and/or merchant with information about offers, a spending level of a user, payment options for a merchant, and/or any other suitable information. Micro registry 110 may be capable of accessing various information sources to enhance the interaction between the user and the merchant via user device 135 and merchant device 145 respectively.

In various embodiments, micro registry 110 may be an environment that may be monitored. Micro registry 110 may also be monetized. For example, transactions initiated and/or completed over micro registry 110 may be assessed a service fee. In this regard, a transaction may be a payment, a connection between a user and service hosts, presentation of an offer to a user, an advertisement, and/or the like. Micro registry 110 may also be a communication platform. In this regard, micro registry 110 may facilitate local communication between a user and a merchant when a user is in a merchant's facility and/or interacting with a merchant's BLE beacon. Micro registry 110 may also be a repository for information that would be helpful to a user when interacting with a merchant location. For example, micro registry 110 may facilitate a user's connection with a store directory and/or map via a merchant gateway that is provided through a merchant gateway. Micro registry 110 may facilitate a user's access to in-store offers that are presented through the merchant gateway.

In various embodiments, micro registry 110 may be capable of facilitating short range communication between users, merchants, and/or third parties to facilitate transactions, offers, loyalty and/or any other suitable information and/or contact. Moreover, micro registry 110 may facilitate mobile payment, secure communication, reservations for items, availability of items, and/or the like. Additional information regarding mobile payments, offers, loyalty benefits, rewards, and/or the like may be found in U.S. Ser. No. 14/284,817 entitled SYSTEMS AND METHODS FOR DYNAMIC PROXIMITY BASED E-COMMERCE TRANSACTIONS and filed on May 22, 2014, which is incorporated by reference in its entirety for all purposes. Additional information regarding mobile payments, offers, loyalty benefits, rewards, and/or the like may also be found in U.S. Ser. No. 14/339,284 entitled SYSTEMS AND METHODS FOR PROXIMITY BASED COMMUNICATION and filed on Jul. 23, 2014, which is incorporated by reference in its entirety for all purposes.

In various embodiments, micro registry 110 may be configured as an open platform that may be accessible by any payment provider, offer provider, user, and/or the like. In this regard, micro registry 110 may include various permissions and/or access protocols. However, micro registry 110 may be configured to connect various users and service hosts to minimize the impact of fragmentation across the various service hosts and users.

The phrases consumer, customer, user, account holder, account affiliate, cardmember or the like shall include any person, entity, business, government organization, business, software, hardware, machine associated with a transaction account, that buys merchant offerings offered by one or more merchants using the account and/or that is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may be may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or, downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a biometric, and the like.

The system may include or interface with any of the foregoing accounts, devices, and/or a transponder and reader in BLE communication with the transponder (which may include a fob), or communications between an initiator and a target enabled by short range communications protocols. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

Phrases and terms similar to "transaction" may include any purchase, exchange, lease, rental, deal, agreement, authorization, settlement, information exchange, item exchange, a record of charge (or "ROC"), record of transaction ("ROT"), including all related data and metadata, and/or the like. Moreover, the transaction, information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Phrases and terms similar to "transaction" may include any purchase, authorization, settlement, a record of charge (or "ROC"), record of transaction ("ROT") and/or the like. Moreover, the transaction, information associated with the transaction, and/or a record associated with the transaction may comprise a unique identifier associated with a transaction. A transaction may, in various embodiments, be performed by one or more members using a transaction account, such as a transaction account associated with a transaction account such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
receiving, by at least one computing device, a service request from a micro-app executed by a mobile device, the service request received from the micro-app through a localized communication with a Bluetooth low energy (BLE) beacon device, the micro-app further utilizing a communication interface of an operating system according to pre-determined rules of the mobile operating system;
acknowledging, by the at least one computing device, the service request through the BLE beacon device associated with a location, wherein the service request comprises a location indication generated by the mobile device;
identifying, by the at least one computing device, a service host associated with the service request based upon the location indication and an identity associated with the mobile device;
receiving, by the at least one computing device, content from the service host in response to the location indication and the identity associated with the mobile device; and
connecting, by the at least one computing device, the mobile device with the content received from the service host, wherein the content facilitates communication between the mobile device and the service host that is based upon the location.

2. The method of claim 1, wherein the BLE beacon device comprises one of a plurality of beacons defining a geo-fence for the location.

3. The method of claim 1, wherein the service host comprises a device associated with the location and the mobile device communicates with the service host over a network.

4. The method of claim 1, wherein the at least one computing device completes the communication on behalf of the mobile device and on behalf of a location associated with the BLE beacon device.

5. The method of claim 1, wherein the service request causes a second micro-app associated with the location to be launched on the user device.

6. The method of claim 1, further comprising pushing, by the at least one computing device, content to the mobile device via the BLE beacon device in response to receiving the service request from the mobile device.

7. The method of claim 1, wherein the communication between the mobile device and the service host comprises a behavior tracking interaction.

8. A non-transitory computer readable medium having instructions stored thereon that, when executed by at least one computing device, causes the at least one computing device to at least:
receive a service request from a micro-app executed by a mobile device, the service request received from the micro-app through a localized communication with a Bluetooth low energy (BLE) beacon device, the micro-app further utilizing a communication interface of an operating system according to pre-determined rules of the mobile operating system;
acknowledge the service request through the BLE beacon device associated with a location, wherein the service request comprises a location indication generated by the mobile device;
identify a service host associated with the service request based upon the location indication and an identity associated with the mobile device;
receive content from the service host in response to the location indication and the identity associated with the mobile device; and
connect the mobile device with the content received from the service host, wherein the content facilitates communication between the mobile device and the service host that is based upon the location.

9. The non-transitory computer readable medium of claim 8, wherein the BLE beacon device comprises one of a plurality of BLE beacons defining a geo-fence for the location.

10. The non-transitory computer readable medium of claim 8, wherein the service host comprises a device associated with the location and the mobile device communicates with the service host over a network.

11. The non-transitory computer readable medium of claim 8, wherein the at least one computing device completes the communication on behalf of the mobile device and on behalf of a location associated with the BLE beacon device.

12. The non-transitory computer readable medium of claim 8, wherein the service request causes a second micro-app associated with the location to be launched on the user device.

13. The non-transitory computer readable medium of claim 8, wherein the instructions further cause the at least one computing device to push content to the mobile device via the BLE beacon device in response to receiving the service request from the mobile device.

14. The non-transitory computer readable medium of claim 8, wherein the communication between the mobile device and the service host comprises a behavior tracking interaction.

15. A system comprising:
at least one computing device; and
instructions executed by the at least one computing device, wherein the instructions cause the at least one computing device to at least:
receive a service request from a micro-app executed by a mobile device, the service request received from the micro-app through a localized communication with a Bluetooth low energy (BLE) beacon device, the micro-app further utilizing a communication interface of an operating system according to pre-determined rules of the mobile operating system;
acknowledge the service request through the BLE beacon device associated with a location, wherein the service request comprises a location indication generated by the mobile device;
identify a service host associated with the service request based upon the location indication and an identity associated with the mobile device;
receive content from the service host in response to the location indication and the identity associated with the mobile device; and
connect the mobile device with the content received from the service host, wherein the content facilitates communication between the mobile device and the service host that is based upon the location.

16. The system of claim 15, wherein the BLE beacon device comprises one of a plurality of BLE beacons defining a geo-fence for the location.

17. The system of claim 15, wherein the service host comprises a device associated with the location and the mobile device communicates with the service host over a network.

18. The system of claim 15, wherein the at least one computing device completes a communication on behalf of the application executed by the user device and on behalf of the device associated with the location.

19. The system of claim 15, wherein the service request causes a second micro-app associated with the location to be launched on the user device.

20. The system of claim 15, wherein the instructions further cause the at least one computing device to push content to the mobile device via the BLE beacon device in response to receiving the service request from the mobile device.

\* \* \* \* \*